(12) United States Patent
Cronan

(10) Patent No.: US 11,496,711 B1
(45) Date of Patent: Nov. 8, 2022

(54) SYSTEMS AND METHODS FOR COLLABORATIVE CONFERENCING AND ANNOTATING PRESENTED ASSETS WITH RELEVANT CONFERENCE CONTRIBUTIONS

(71) Applicant: 5th Kind, Inc., Los Angeles, CA (US)

(72) Inventor: Stephen Cronan, Los Angeles, CA (US)

(73) Assignee: 5th Kind, Inc., Los Angeles, CA (US)

( * ) Notice: Subject to any disclaimer, the term of this patent is extended or adjusted under 35 U.S.C. 154(b) by 0 days.

(21) Appl. No.: 17/323,256

(22) Filed: May 18, 2021

(51) Int. Cl.
*H04N 7/15* (2006.01)
*H04N 5/278* (2006.01)
*G06F 3/04842* (2022.01)

(52) U.S. Cl.
CPC ......... *H04N 7/155* (2013.01); *G06F 3/04842* (2013.01); *H04N 5/278* (2013.01)

(58) Field of Classification Search
CPC .... G06F 3/04842; H04N 5/278; H04N 7/155; H04N 7/141; H04N 7/14; H04N 7/15; H04N 7/157

USPC .............................................. 348/14.02–14.9
See application file for complete search history.

(56) References Cited

U.S. PATENT DOCUMENTS

| | | | |
|---|---|---|---|
| 10,572,135 B1* | 2/2020 | Fieldman | G06F 15/16 |
| 11,018,884 B2* | 5/2021 | Faulkner | H04N 7/155 |
| 2015/0341401 A1* | 11/2015 | Lee | G06F 3/0481 |
| | | | 715/753 |

* cited by examiner

*Primary Examiner* — Maria El-Zoobi
(74) *Attorney, Agent, or Firm* — Ansari Katiraei LLP; Arman Katiraei; Sadiq Ansari

(57) ABSTRACT

Disclosed is a collaboration system that synchronizes what is seen and heard by all participants to a conference such that participant input provided during the conference are seen and heard with respect to the same state of a presented asset. Additionally, the collaboration system may monitor the conference, may extract a first participant contribution prior to presentation of a first asset in the conference and a second participant contribution that is made during a particular interval of the conference when the first asset is presented. The collaboration system may link the second participant contribution to the first asset, may receive a request for the first asset after the conference has concluded, and may provide the first asset with the second participant contribution in response to the request.

19 Claims, 7 Drawing Sheets

SYSTEMS AND METHODS FOR COLLABORATIVE CONFERENCING AND ANNOTATING PRESENTED ASSETS WITH RELEVANT CONFERENCE CONTRIBUTIONS

BACKGROUND

Online conferencing and collaboration tools have made it easier for remote personnel to meet and work on projects. Using a live video and/or audio feed, conference participants may see and hear each other, and may present different files for the participants to opine, work, and/or otherwise collaborate on. In particular, the conference participants may discuss desired enhancements, changes, and/or other tasks that should be performed after the conclusion of the conference. In such cases, the participants may manually take notes to record the tasks that were assigned to them during the conference and/or the changes that were discussed. The manual note taking may be inaccurate as some elements may be missed or incorrectly summarized. The manual note taking may also cause the participants to be less actively involved in the conference as a result of having to jot down notes.

The conference may be recorded and replayed at a later time to avoid note taking during the conference. However, the user will likely have to replay the entire conference to find where instructions and/or notes were given in the conference, which assets those instructions and/or notes apply to, and/or to ensure a particular asset or topic of conversation was not circled-back to at a later time during which additional instructions and/or notes were provided.

DETAILED DESCRIPTION OF PREFERRED EMBODIMENTS

The following detailed description refers to the accompanying drawings. The same reference numbers in different drawings may identify the same or similar elements.

Disclosed are systems and methods for collaborative conferencing. The collaborative conferencing may include synchronizing what is seen and heard by all conference participants to ensure that any provided instructions, comments, annotations, or input provided during the conference are seen and heard with respect to the same conference state and/or the same state of an asset that is the subject of discussion. In particular, the collaborative conferencing may include synchronizing the participant activity (e.g., dialog, video, comments, inputs, etc.) in connection with one or more assets that are presented during the conference so that each participant sees the exact same frame of video, sees the same slide in a changing presentation, hears the same exact audio, and/or is presented with the same part of an asset when any of the participants provides instructions, comments, annotations, or input to a particular part or a particular state of the asset.

The systems and methods may further include automatically annotating presented assets with relevant conference contributions made by the participants while presenting those assets as part of a conference. For instance, the systems and methods may directly link the instructions, comments, annotations, and/or other input, that are provided by different participants while presenting a particular asset in a conference, to that particular asset with relevant timestamps or temporal links. Accordingly, when a user accesses that particular asset after the conference concludes, the user may receive the particular asset along with selectable elements with which to directly access or replay any of the instructions, comments, annotations, and/or other input with the matching state of the asset (e.g., frame of video, slide of a presentation, highlighting of text, etc.) at the corresponding points of time during the conference when those instructions, comments, annotations, and/or other input were provided.

Figure 1:
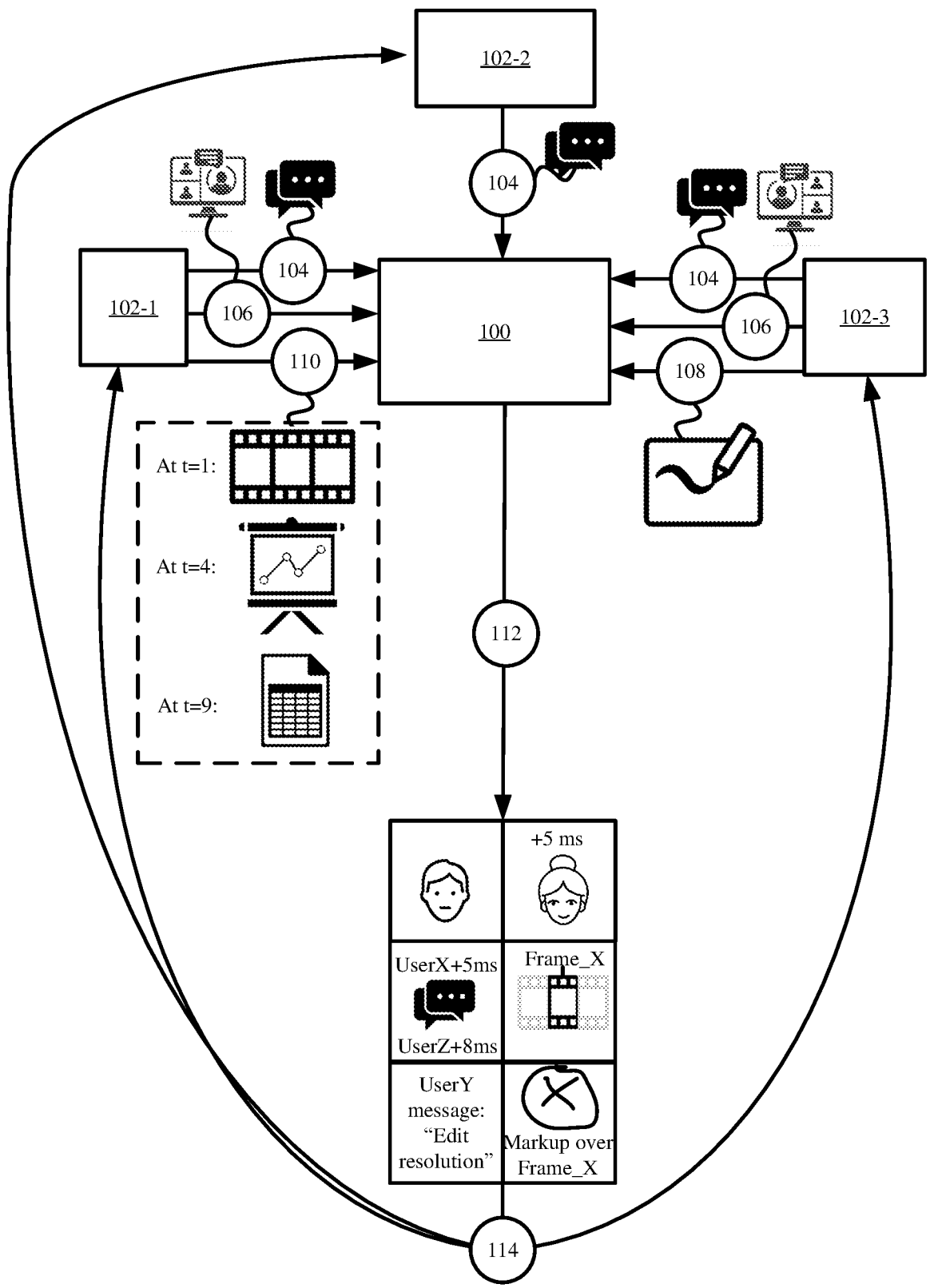
FIG. 1 illustrates an example of collaborative conferencing in accordance with some embodiments presented herein.

FIG. 1 illustrates an example of collaborative conferencing in accordance with some embodiments presented herein. As shown in FIG. 1, the collaborative conferencing is provided by collaboration system 100. Specifically, collaboration system 100 may provide different remote participants 102-1, 102-2, and 102-3 (herein sometimes collectively referred to as "participants 102" or individually as "participant 102") an interface to a collaborative conference, and may synchronize the feed that is provided to each participant 102.

Each participant 102 may use a device to connect to collaboration system 100 over a data network and/or telecommunications network. Each connection may support one or more of audio feed 104, video feed 106, input feed 108, presentation feed 110, and/or other feeds.

Audio feed 104 and video feed 106 may be used to exchange audio and images of the conference participants 102. For instance, audio feed 104 may include the sounds captured by the microphone of a participant's 102 device, and video feed 106 may include the images captured by a camera of a participant's 102 device.

Input feed 108 may be used for auxiliary forms of communication outside audio and/or video feeds 104 and 106. Input feed 108 may include real-time messaging or chat tools, virtual whiteboards for providing annotations or otherwise marking up a presented asset or for providing a digital canvas onto which participants 102 may draw or provide other input, and/or other collaboration, conferencing, or conferencing tools.

Presentation feed 110 may be used for the sending and receiving of different assets. The assets may include files, auxiliary audio and/or video streams (e.g., movies, recorded video files that are separate from the video being captured in video feed 106, recorded audio files that are separate from the audio being captured in audio feed 104, etc.), applications, interactive content, and/or other digitized information that different participants 102 wish to present for collaboration. In some embodiments, collaboration system 100 may connect to one or more asset repositories where different assets for a conference may be accessed.

Collaboration system 100 may ingest one or more feeds 104, 106, 108, and/or 110 from the participant devices and/or from the asset repository, and may derive various diagnostic and/or timing information from each feed 104, 106, 108, and/or 110 from each participant device and the asset repository. For instance, collaboration system 100 may measure the latency associated with each feed. The latency may account for the time for sending or receiving each feed from each device and/or the asset repository. The latency may further account for the responsiveness of each device and/or the asset repository. For instance, a first participant device may have more processing power than a second participant device such that the first participant device may render video sooner than the second participant device, or the first participant device may acknowledge and request next data packets faster than the second participant device.

Collaboration system 100 may generate (at 112) a unified feed that combines and synchronizes each of the different feeds 104, 106, 108, and/or 110 from each participant 102 in a single interface. Collaboration system 100 may generate (at 112) the unified feed by using the latency measurements to adjust for differences in network performance, device performance, and/or other timing offsets between each of the received feeds 104, 106, 108, and/or 110. For instance, a chat feed providing text messages between the participants may arrive at collaboration system 100 faster than a video feed because of amount of device resources and/or because of the different network protocols used in generating and sending the data packets for each feed, and/or because of the data packet sizes. In any case, collaboration system 100 may time-align each of the received feeds 104, 106, 108, and/or 110 in generating (at 112) the unified feed. Accordingly, the video and audio feeds from each participant 102 may be synchronized with a specific state from one or more input feeds 108 and/or a specific state of one or more assets being presented in presentation feeds 110.

Collaboration system 100 may distribute (at 114) the unified feed to each participant 102 so that each participant 102 receives the exact same state from every feed, and/or sees and hears the same content as every other participant 102. In some embodiments, collaboration system 100 may use the latency measurements to synchronize the arrival of the unified feed at the different participant 102 devices. For instance, collaboration system 100 may send the unified feed 10 millliseconds ("ms") sooner to a first participant device than a second participant device in response to the first participant device experiencing 10 ms more latency than the second participant device. By synchronizing the arrival of the unified feed, collaboration system 100 may ensure that the different participants 102 receive the unified feed at the same time or about the same time, thereby providing the same conference state, audio, and/or video to each participant 102 at the same time.

The unified feed generated (at 112) and/or distributed (at 114) by collaboration system 100 may differ from other conferencing solutions that simply bridge and reroute individual feeds to a particular device. For instance, prior art solutions for conferencing three participants may include forwarding a first feed from a first participant and a second feed from second participant directly to a third participant. In this case, if the first feed suffers greater latency or other issues relative to the second feed, the first feed may arrive delayed and misaligned with the second feed at the device of the third participant. Accordingly, audio, video, and/or input from the first participant may arrive at the third participant later than audio, video, and/or input from the second participant, and it may be difficult for the third participant to determine what the first and second participants are referring to when collaborating on the same asset or providing feedback to an asset that changes (e.g., a video stream or frames of a movies).

The unified feed generated (at 112) by collaboration system 100 may prevent any such alignment issues, and may ensure that the audio, video, and/or input from all participants as well as the asset state are time-aligned and synchronized. Consequently, with reference back to FIG. 1, first participant 102-1 may play a video asset during the conference, and third participant 102-3 may provide visual markups of specific frames from the video asset and/or may provide other commentary with respect to those specific frames. Collaboration system 100 may generate (at 112) the unified feed to synchronize those different feeds 104, 106, 108, and 110, thereby ensuring that all participants 102 see the same specific frames of the video asset with the time-aligned commentary from third participant 102-3 regardless of feeds 104, 106, 108, and 110 from participants 102 reaching collaboration system 100 at different times or with different latencies. Similarly, collaboration system 100 may synchronize the distribution (at 114) of the unified feed to ensure that each participant 102 receives, hears, and sees the unified feed at about the same time despite latency differences between different participants 102 and collaboration system 100 and/or differences in resources across the device of participants 102.

Collaboration system 100 may use the synchronized feeds to facilitate the automated annotation of the assets. In particular, collaboration system 100 may annotate assets that are presented at different times during a conference with the synchronized contributions provided by the participants at those same times. The synchronized contributions may include the spoken dialog from one or more participants (e.g., audible comments about the particular asset state), the video reactions or movements of the one or more participants, chat messages, visual markups, drawings, and/or other input provided by the participants during different states of a presented asset. In should be noted that the contributions made by the participants may include instructions, comments, and/or notes that do not change or alter the asset or its contents. In annotating an asset, collaboration system 100 may synchronize the participant contributions made at a particular point in time to the state of the asset that existed at that same particular point in time so that those contributions may be played back in combination with the same asset state after the conclusion of the conference, wherein the asset state may include a specific frame of video, a particular second of audio, a specific slide within a presentation, certain words that were highlighted in a document at some specific period of time, and/or one of several variations that the asset may be presented with.

Figure 2:
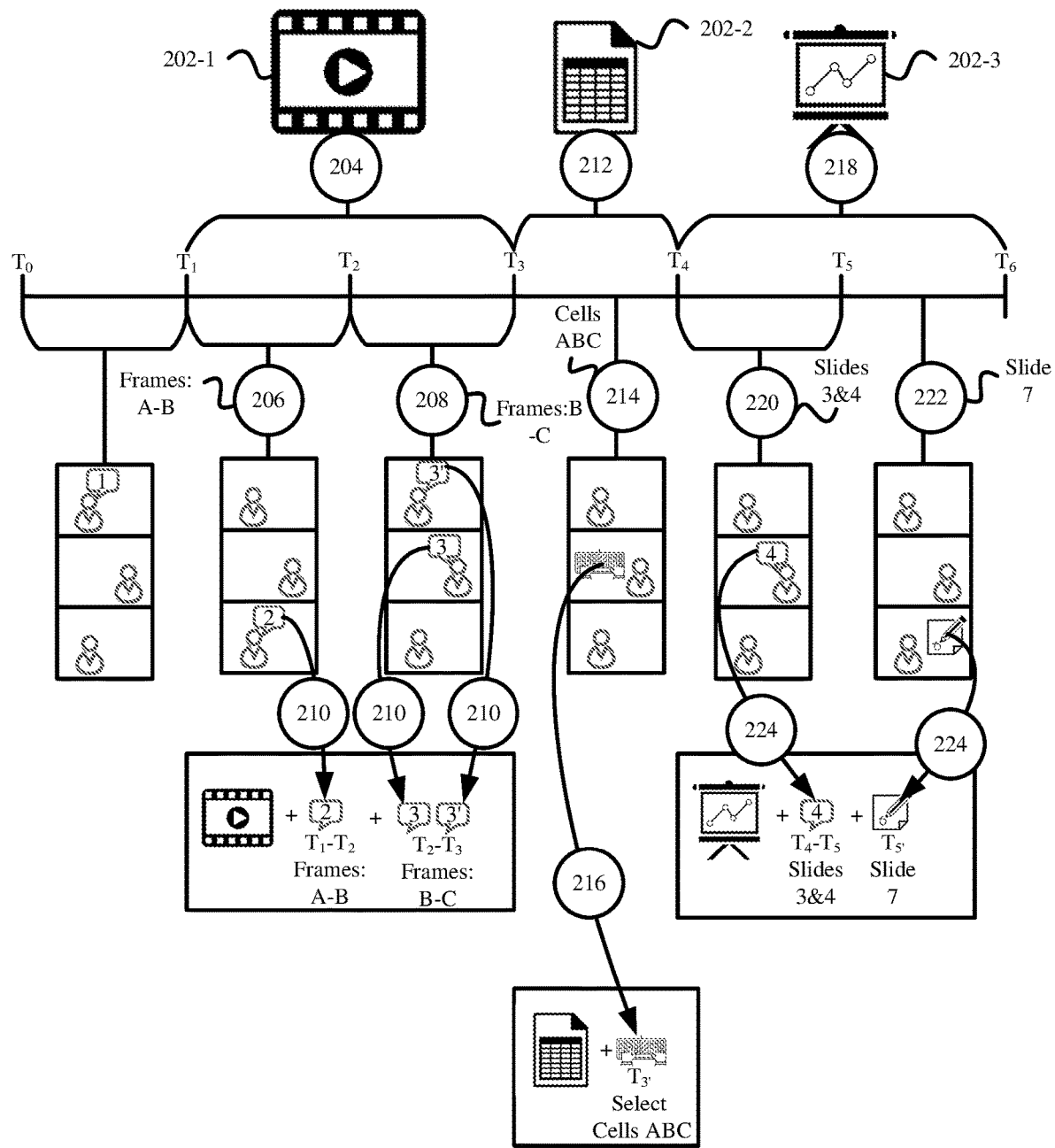
FIG. 2 illustrates an example of annotating different assets with relevant conference contributions that are provided by different participants while presenting each of the different assets in accordance with some embodiments presented herein.

FIG. 2 illustrates an example of annotating different assets with relevant conference contributions that are provided by different participants while presenting each of the different assets in accordance with some embodiments presented herein. FIG. 2 illustrates a timeline for a conference involving three participants and three assets 202-1, 202-2, and 202-3 (herein sometimes collectively referred to as "assets 202" or individually as "asset 202"). As shown in the timeline, assets 202 are presented at different points throughout the collaborative conference, and the participants provide different comments, input, and/or other contributions to each asset 202 while that asset 202 is being presented and discussed.

Each of the three participants may have an audio and/or video feed with which to communicate with the other participants, and/or to provide verbal and/or visual contributions to a presented asset 202. The collaborative conference may include other tools with which the participants may communicate and/or provide other contributions to a presented asset 202. For instance, the collaborative conference may include a real-time messaging tool for textual messages that may be sent to all participants or to specific participants, markup tools for drawing or providing visual input over a screen or asset 202 that is presented to all participants or to specific participants, and/or other communication tools besides the audio and video feeds with which the participants hear and see each other.

As shown in FIG. 2, the conference may involve presenting video or movie 202-1 (e.g., a first asset) during time $T_1$-$T_3$, presenting spreadsheet 202-2 (e.g., a second asset) during time $T_3$-$T_4$, and presenting slide deck 202-3 (e.g., a third asset) during time $T_4$-$T_6$. Different participants may activate the sharing or presentation of assets 202 at different times, and all participants may see, discuss, comment on, provide input to, and/or otherwise contribute to each of the assets 202 while those assets 202 are being presented as part of the unified conference feed.

Collaboration system 100 may synchronize the different feeds received from and/or presented to the different participants. Collaboration system 100 may synchronize the different feeds so that each participant sees and hears the same commentary while viewing the same asset state.

Collaboration system 100 may monitor, record, and/or process the conference in order to automatically annotate each asset 202 at different presentation states with relevant notes, instructions, comments, input, and/or other contributions that the participants provided while those presentation states were active or presented as part of the conference. As shown in FIG. 2, collaboration system 100 may synchronize playback (at 204) of different frames from video asset 202-1 on devices of all participants during times $T_1$-$T_3$, may detect (at 206 and 208) different comments and/or contributions provided by one or more of the participants when a particular frame or set of frames are presented, and may link (at 210) the detected comments and/or contributions back to the particular frame or set of frames of video asset 202-1.

Consequently, when video asset 202-1 is subsequently accessed (e.g., after completion of the conference), collaboration system 100 may provide video asset 202-1 to the requesting device along with the timestamped, time-linked, and/or frame-linked annotations for different frames of video asset 202-1. The annotations may therefore be played back, viewed, and/or otherwise presented when playback of video asset 202-1 reaches the corresponding times or set of frames when those annotations were made during the conference.

As shown in FIG. 2, collaboration system 100 may detect (at 206) the third participant speaking during time $T_1$-$T_2$ when a first set of frames from video asset 202-1 are presented, and may detect (at 208) the first participant and the second participant speaking during time $T_2$-$T_3$ when a second set of frames from video asset 202-1 are presented. Collaboration system 100 may annotate video asset 202-1 to link (at 210) the audio and/or textual transcript of the third participant speaking to the first set of frames and/or time $T_1$-$T_2$, and to link (at 210) the audio and/or textual transcript of the first participant and the second participant speaking to the second set of frames or time $T_2$-$T_3$.

At time $T_3$, collaboration system 100 may determine (at 212) that the presentation feed has changed from presenting video asset 202-1 to presenting spreadsheet asset 202-2. Collaboration system 100 may monitor participant contributions during the presentation of spreadsheet asset 202-2, and may detect (at 214) a text message that is input by the second participant at a specific time while spreadsheet asset 202-2 is presented and/or a specific cell or set of cells within spreadsheet asset 202-2 are selected or are otherwise being interacted with during the conference. In this instance, the specific time and/or the specific cell or set of cells being interacted with may represent the state of spreadsheet asset 202-2 when the text message (e.g., participant contribution) is detected (at 214). Accordingly, collaboration system 100 may annotate (at 216) spreadsheet asset 202-2 to include the text message at the specific time in the conference and/or in conjunction with the selection or other interaction with specific cell or set of cells.

At time $T_4$, collaboration system 100 may determine (at 218) that the presentation feed has once again changed and slide deck asset 202-3 is now the focus of the conference. Collaboration system 100 may monitor participant contributions during the presentation of slide deck asset 202-3. Collaboration system 100 may detect (at 220) the second participant speaking during time $T_4$-$T_5$ when one or more slides from slide deck asset 202-3 are presented, and may detect (at 222) visual input entered by the third particular at a specific time when a particular slide of slide deck asset 202-3 is presented. In this instance, the asset state corresponds to the time at which different slides from the slide deck asset 202-3 are presented or the slides that were presented when the participant contributions were detected (at 220 and 222). Collaboration system 100 may annotate (at 224) slide deck asset 202-3 to link the audio and/or textual transcript of the second participant speaking to the one or more slides of slide deck asset 202-3, and to include the visual input entered by the third participant with the particular slide.

In some embodiments, linking and/or otherwise including the participant contributions (e.g., the annotations) to an asset may include embedding the contributions into the metadata of the asset file, embedding links to the contributions into the metadata and retrieving the contributions from a database when the asset is accessed, and/or retrieving the contributions from a recorded copy of the unified conference feed when the asset is accessed. The contributions, which include comments, notes, instructions, feedback, and/or other participant input that do not directly change the asset, may then be selectively accessed or played back when accessing the asset outside of the conference. For instance, a user may request and receive slide deck asset 202-3 from collaboration system 100 with the annotated contributions from the collaborative conference, may view the slides without any of the annotated contributions, and/or may select to view, hear, playback, and/or otherwise access the first contribution with the audio and/or textual transcript of the second participant speaking when the one or more slides were presented during the conference, or the second contribution with the visual input entered by the third participant when the particular slide was presented during the conference.

As a result of the automatic annotations that are extracted from the conference and linked directly to the individual assets, the participants are free to participate in the conference without extensive note taking and/or manual note taking. Once the conference is complete, the participants may open an individual asset that was presented during the conference, and may access the notes, instructions, comments, inputs, and/or other participant contributions that were provided at various states of that asset during the conference.

By linking the participant contributions not only to the asset, but specific states of the asset, collaboration system 100 may provide context to the contributions and/or may identify exactly where the contributions apply so that the participants can perform subsequent actions without searching through a recorded copy of the conference and/or through the asset. For instance, the conference may involve presenting a first video asset, discussing edits to specific frames of the first video asset, presenting a second audio asset, discussing changes to the sound properties of the audio asset, presenting a third spreadsheet asset, and discussing changes to the formatting of the third spreadsheet asset. If the conference was not properly synchronized, some participants may see and/or hear the video edits with respect to different frames or states of the video asset, some participants may see and/or hear the sound property changes with respect to different parts or states of the audio asset, and/or may see and/or hear the formatting changes with respect to different parts or states of the spreadsheet sheet. The synchronization allows all participants to see and/or hear the contributions in relation to the same asset states, and also allows the contributions to be linked to those same asset states for subsequent reference. In other words, collaboration system 100 enables the participants to open the first video asset after the conference is complete, and included with the first video asset are the discussed edits and/or an identification of the specific time or the specific frames of the first video asset to which the edits apply. Similarly, the participants may open the second audio asset, and may obtain the changes to the sound properties that were discussed with respect to specific intervals of the second audio asset. Alternatively, if the participants open the third spreadsheet asset, included within the third spreadsheet asset are the discussed formatting changes and/or an identification of the spreadsheet cells (e.g., spreadsheet state) to which the formatting changes apply.

Figure 3:
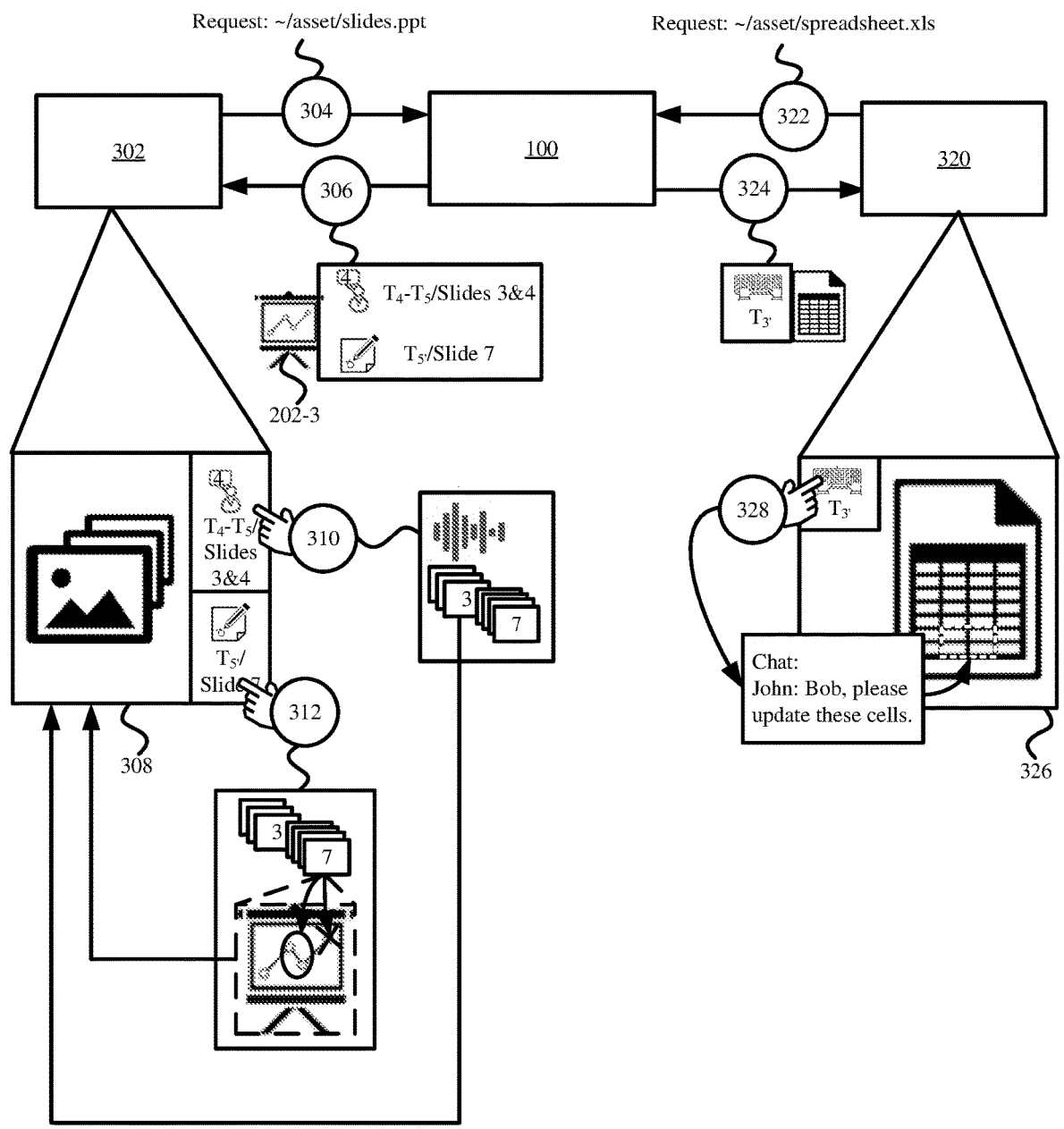
FIG. 3 illustrates examples of annotations that are added to individual assets by a collaboration system in accordance with some embodiments presented herein.

In some embodiments, collaboration system 100 may generate an interface with one or more selectable user interface ("UI") elements with which to access the annotations that are linked to a particular asset when that particular asset is opened or accessed outside the conference. FIG. 3 illustrates examples of annotations that are added to individual assets by collaboration system 100 in accordance with some embodiments presented herein.

As shown in FIG. 3, first user device 302 may issue (at 304) a request for slide deck asset 202-3 after collaboration system 100 annotated slide deck asset 202-3 with the participant contributions provided during time $T_4$-$T_6$ when slide deck asset 202-3 was presented in the conference of FIG. 2. The request may include a Uniform Resource Locator ("URL"), file system path, and/or another identifier for accessing slide deck asset 202-3. Collaboration system 100 may receive (at 304) or intercept the request.

In response to the request, collaboration system 100 may retrieve a copy of slide deck asset 202-3 with or without annotations from local storage, an asset repository, and/or an external source. When the annotations are stored within the metadata or other parts of slide deck asset 202-3, collaboration system 100 may return (at 306) slide deck asset 202-3 with the embedded annotations to first user device 302. When the annotations are stored separate from slide deck asset 202-3, collaboration system 100 may query a database or other repository where the annotations are stored using the URL, file system path, and/or other identifier of slide deck asset 202-3, may obtain the annotations in response to the query, and may provide (at 306) slide deck asset 202-3 with the retrieved annotations to first user device 302.

First user device 302 may open slide deck asset 202-3 in user interface ("UI") 308 that is generated by collaboration system 100 and/or an application that incorporates the annotated contributions as part of UI 308 and/or presentation of slide deck asset 202-3. UI 308 may include UI elements for accessing the annotations that collaboration system 100 added to slide deck asset 202-3. In some embodiments, the UI elements may be hidden and presented based on user preferences or a toggle included within the UI. The UI elements may be presented at a side or border of the presentation of slide deck asset 202-3. In some other embodiments, the UI elements may appear when specific slides or states of slide deck asset 202-3 are accessed. For instance, a first UI element may appear with a particular slide of slide deck asset 202-3 when the first UI element contains a comment, note, instruction, and/or other input that was provided during the conference when that particular slide was presented.

In some embodiments, each UI element may be separately selected or activated to expose the comment, note, instruction, and/or other input associated with that UI element, and/or to transition slide deck asset 202-3 to the corresponding state (e.g., slide or set of slides) that was presented when the selected input was detected and/or provided. For instance, selection (at 310) of a first selectable UI element may transition slide deck asset 202-3 to the one or more slides (e.g., slides 3 & 4) that were presented during time $T_4$-$T_5$, and may begin playback of the audio of the second participant speaking during time $T_4$-$T_5$. In doing so, the user is able to listen to the comments with the same context or asset state as when those comments were originally given during the conference. In some embodiments, the first selectable UI element may include a speech-to-text transcript for the audio of the second participant so that the user may reference the comments at any time while slide deck asset 202-3 is open. In some embodiments, UI 308 may present the transcript in a side panel separate or part of the UI elements, and the transcript may include timestamps for the $T_4$-$T_5$ time interval during which the second participant was speaking and/or references to the one or more slides that were presented during that $T_4$-$T_5$ time interval.

As further shown in FIG. 3, UI 308 may also include a second selectable UI element. Selection (at 312) of the second selectable UI element may transition slide deck asset 202-3 to the particular slide (e.g., slide 7) that was presented during time $T_5$-$T_6$, and recreate the visual input entered by the third participant when the particular slide was presented during the conference. For instance, the visual input may be presented over the particular slide to show markups that the third participant used to annotate the particular slide during the conference. Alternatively, the visual input may include notes that the third participant drew on a digital whiteboard that was separate from the presentation of the particular slide but that was relevant to the particular slide. Here again, collaboration system 100 may generate those same notes alongside a presentation of the particular slide in response to selection (at 312) of the second selectable UI element.

FIG. 3 further illustrates second user device 320 requesting (at 322) spreadsheet asset 202-2 after collaboration system 100 appended spreadsheet asset 202-2 with the participant contributions from the conference of FIG. 2.

Collaboration system 100 may provide (at 324) spreadsheet asset 202-2 with the notes, instructions, comments, input, and/or other conference contributions that were provided when spreadsheet asset 202-2 was presented in the conference.

Second user device 320 may open spreadsheet asset 202-2 in UI 326. UI 326 may include a single UI element for the text message that was input by the second participant when spreadsheet asset 202-2 was presented during the conference. In some embodiments, the single UI element may directly present the contents of the text message and/or the timestamp or asset state when the text message was entered. For instance, the asset state may identify the one or more cells within spreadsheet asset 202-2 that were highlighted or selected at the time the text message was entered by second participant, or may identify a change to values of one or more cells that occurred immediately before or at the same time as the text message being entered by the second participant. In some other embodiments, the single UI element may include a selectable UI element that when selected (at 328) may select or otherwise highlight one or more cells or may change the value of the one or more cells to mirror the asset state when the text message was detected, and may further present the contents of the text message.

The UI may present other annotations or contributions including the transcript of spoken audio from a conference. A user may select different wording or portions from the transcript, and collaboration system 100 or the UI may transition the video and/or audio for the conference to the point in time at which the selected words are spoken.

In some embodiments, the UI may provide a search interface. A user may input words, interactions, and/or other contributions into the search interface. Collaboration system 100 or the UI may scan the annotations to identify matches for the input. The matches may include words from a spoken dialog transcript that match the words input into the search interface, interactions detected within the conference that match interactions specified as input, and/or other contributions that are detected and extracted from the conference and that are specified as input. Collaboration system 100 or the UI may present the matches as selectable UI elements to the user, and/or may transition to a point in the conference at which a match is found.

Figure 4:
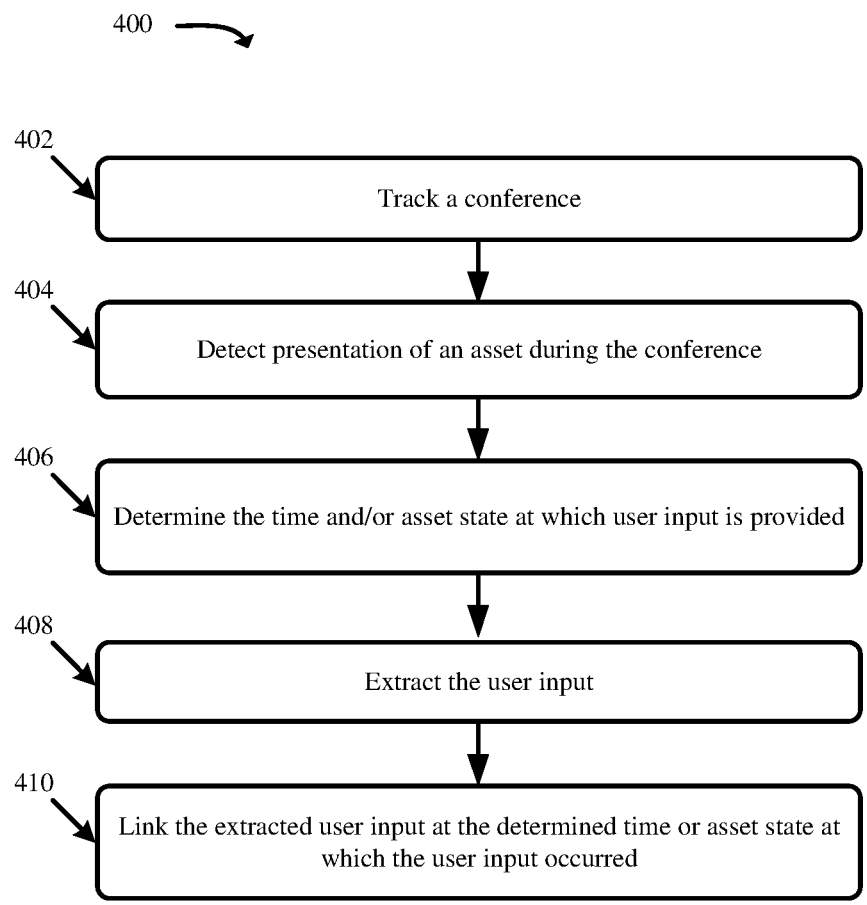
FIG. 4 presents a process for generating the annotations for an individual asset from an active or completed conference in accordance with some embodiments presented herein.

FIG. 4 presents a process 400 for generating the annotations for an individual asset from an active or completed conference in accordance with some embodiments presented herein. Process 400 may be implemented by collaboration system 100.

Process 400 may include tracking (at 402) a conference that includes multiple participants and different assets being presented at different times throughout the conference. In some embodiments, tracking (at 402) the conference may include recording the unified feed. In some other embodiments, tracking (at 402) the conference may include performing a real-time processing and/or parsing of the conference to extract what was said, what was presented, and/or inputs provided by the participants.

Process 400 may include detecting (at 404) the presentation of an asset at some point in the conference. Collaboration system 100 may detect (at 404) the presentation of the asset in response to a new presentation feed being activated as part of the conference and/or a URL of the conference changing to include an identifier of the asset. A participant may activate a presentation feed by selecting a file, content, or other asset, and by sharing, presenting, adding, or otherwise including that asset as part of the conference. The presentation feed may display the asset or contents of the asset within a UI or portion of the unified conference feed provided to each participant device. Collaboration system 100 may detect (at 404) the presentation of the asset based on network messaging originating from the participant device that shares, presents, adds, or otherwise includes that asset as part of the presentation. The network messaging may include the identifier of the asset being shared. For instance, the network messaging may include the contents of the asset that are uploaded to collaboration system 100 for inclusion as part of the unified feed, and/or the identifier that identifies the asset or provides an address, file path, file name, location, URL, and/or other value from where collaboration system 100 may retrieve the asset.

Process 400 may include determining (at 406) the time and/or asset state at which user input is provided while the asset is active, shared, and/or presented as part of the conference. Determining (at 406) the time of the user input may include tracking a single point in time at which the user input is shared with the other participants. For instance, the submission or presentation of a text message from one participant to one or more other participants may be associated with a particular time that is defined relative to the start time or duration of the conference. Alternatively, the user input may span a period of time. For instance, a participant may speak for a particular duration while the asset is presented, and the audio may contain notes, instructions, and/or other input that is pertinent to the asset. In some embodiments, determining (at 406) the asset state may include matching the timing of the user input to the timing or a presentation state of the asset. For instance, the asset may include a movie or video stream, and the asset state may correspond to the frame, set of frames, or the timing of the set of frames at which the user input occurred. As another example, the asset state may correspond to the highlighting or selection of different asset properties, particular content from a plurality of content of the asset that is presented at the time of the user input, changing in value of a particular asset property, a set of interactions that the participants have had with the asset, and/or other conditions, variables, or properties of the asset at the time of the user input. In some other embodiments, determining (at 406) the asset state may include obtaining a snapshot (e.g., an image) or snippet of the asset or the presentation feed that presents the asset when the user input is provided.

Process 400 may include extracting (at 408) the user input. The extraction (at 408) may include timestamping or tracking a time at which the user input becomes part of the unified feed and/or is made part of the conference. The extraction (at 408) may include isolating, separating, or marking the user input within the unified feed or the individual feeds that form the unified feed. The extracted user input may include a snippet of audio, a snippet of video, text messages, digital drawings or markups provided using a mouse, trackpad, touchscreen, or other input device, and/or other contributions that are supported by the various conferencing tools included as part of the collaborative conference. For instance, the user input may include audio of participants speaking while the asset is presented because the audio may contain notes, comments, instructions, feedback, and/or other participant contributions that are relevant to the presented asset. When the user input includes audio, the extraction (at 408) may include performing a speech-to-text processing or other natural language processing ("NLP") that converts the audio into text. The user input may further include text messages exchanged through a messaging tool, visual input from participants drawing on a virtual whiteboard or annotating the asset (e.g., highlighting, circling, writing, or other input that does not change the contents of the asset), participant reactions captured in the video feed, applications, scripts, and/or services that may provide input or a point of reference for participant comments, and/or other input by which the participants offer notes, suggested changes, or otherwise collaborate with respect to the presented asset.

Process 400 may include linking (at 410) the extracted user input at the determined time or asset state at which the user input occurred. In some embodiments, linking (at 410) the extracted user input may include embedding the user input as part of the asset. For instance, the extracted user input may be added into the asset metadata with timing and/or asset state information that corresponds to the determined state of the asset when the user input occurred. In some embodiments, linking (at 410) the extracted user input may include storing the extracted user input with the determined state of the asset and an asset identifier in a database. The extracted user input with the determined state of the asset may be retrieved and provided to a user device in response to the user device requesting and/or accessing the asset using the asset identifier. The asset identifier may uniquely identify the asset in a file system or repository, and may be include a URL, file path, and/or other unique identification of the asset. In some embodiments, linking (at 410) the extracted user input may include identifying time intervals from the recording of the conference or the presentation feed when the user input occurred, and associating the time intervals with the asset.

For every new asset that is detected and/or presented as part of the conference, process 400 may revert to determining (at 406) the time and/or asset state at which user input for the new asset is provided, extracting (at 408) the user input for the new asset, and linking (at 410) the user input for the new asset to the new asset. In this manner, collaboration system 100 may automatically annotate each asset that is presented during a conference to identify notes, instructions, comments, and/or other user contributions that are synchronized with specific or different states of the asset during the conference. The notes, instructions, comments, and/or other user contributions may be formatted and/or linked to the asset as audio snippets, video snippets, textual transcripts, text messages, visual markups, drawings, and other forms of collaboration and/or communication supported by collaboration system 100. Accordingly, when an asset that was presented in a conference is subsequently accessed, collaboration system 100 may provide the relevant notes, instructions, comments, and/or other user contributions that were made during the conference in relation to specific states of that asset when those user contributions were made. In other words, the user contributions have contextual relevance not just to a particular asset, but changing states of that asset during a conference and/or the times at which the different states were presented in the conference.

Figure 5:
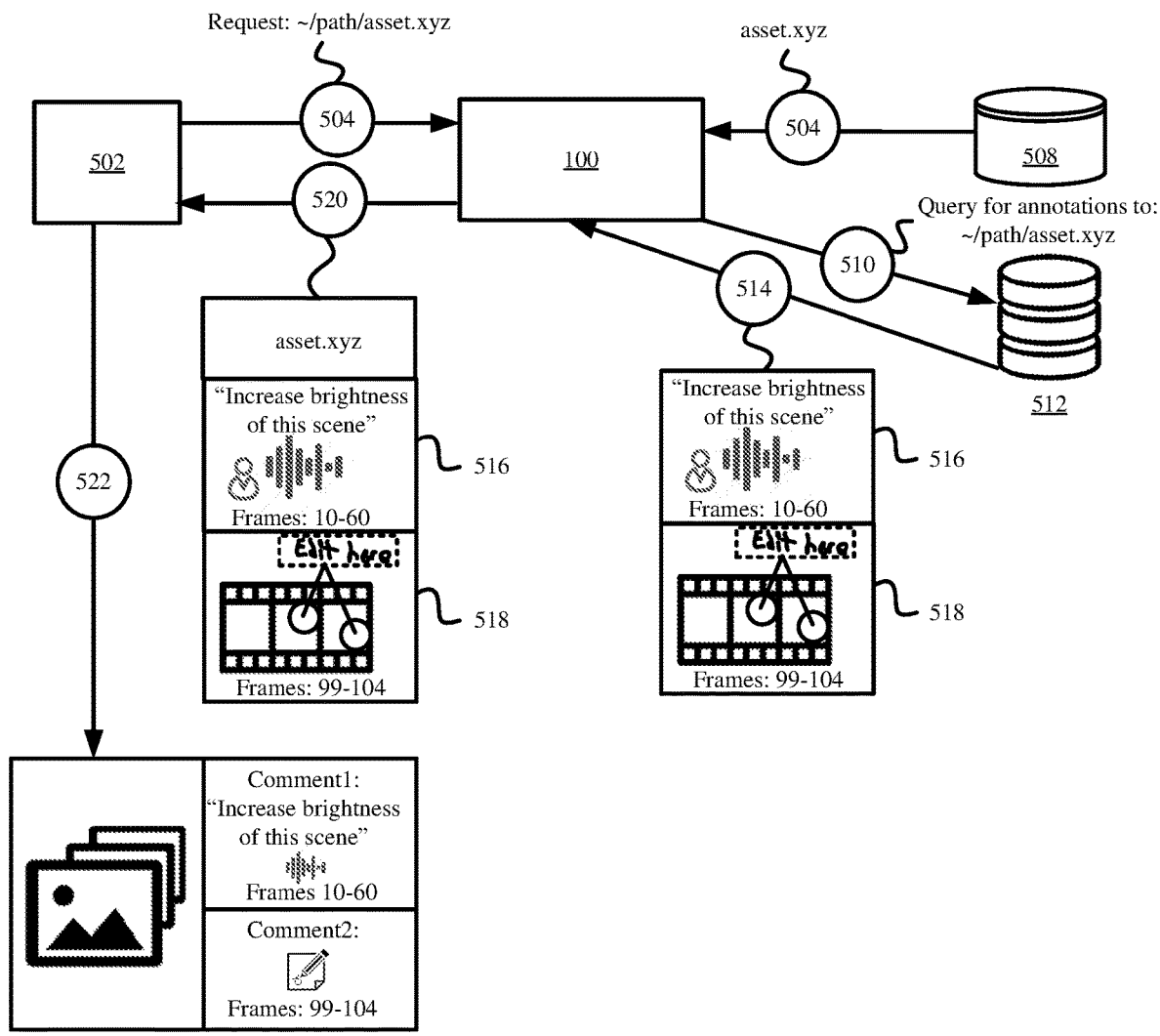
FIG. 5 illustrates an example of accessing user contributions that are directly linked to a particular asset in accordance with some embodiments presented herein.

FIG. 5 illustrates an example of accessing user contributions that are directly linked to a particular asset in accordance with some embodiments presented herein. User device 502 may issue (at 504) a request that includes an identifier of a particular asset that user device 504 is trying to access. The identifier may correspond to a directory path or URL. The request may route to or may be otherwise received by collaboration system 100.

Collaboration system 100 may retrieve (at 506) the particular asset from storage repository 508 identified by the identifier. Storage repository 508 may include local storage of collaboration system 100 or remote storage of an external source that is accessible via a data network.

Additionally, collaboration system 100 may query (at 510) database 512 for annotations from prior conferences that were linked to the particular asset. Collaboration system 100 may use the particular asset identifier to query (at 510) database 512.

In response to the query (at 510), database 512 may return (at 514) different user inputs that were extracted from the prior conferences and that are linked to different states of the particular asset. In this example, the particular asset may correspond to a video file comprised of a plurality of frames, and the user input may include user comments made with respect to different sets of the plurality of frames. For instance, the user input may include audio snippet 516 that is recorded during playback of a first set of frames, and visual input 518 that is recorded during playback of a different second set of frames. Audio snippet 516 may include a verbal suggestion to increase brightness of a scene that is represented by the first set of frames, and visual input 518 may include circling of a particular region within the second set of frames, and adding a comment on a digital whiteboard to edit the circled regions within the second set of frames.

Collaboration system 100 may respond (at 520) to the request by providing user device 502 with the particular asset, audio snippet 516 with timing or other references to the first set of frames (e.g., a first state of the particular asset), and visual input 518 with timing or other references to the second set of frames (e.g., a second state of the particular asset). In some embodiments, collaboration system 100 may respond (at 520) with a single file or UI that includes the contents of the particular asset (e.g., the video file), audio snippet 516, visual input 518, and the corresponding links to the different states of the particular asset. In some other embodiments, collaboration system 100 may provide the particular asset, audio snippet 516, visual input 518, and the corresponding links to the different states of the particular asset as separate files, separate network message exchanges, and/or different content for presentation in a single UI on user device 502.

User device 502 may open the particular asset embedded with the linked user contributions, the files for the particular asset and the linked user contributions, and/or the UI containing the contents of the particular asset and the linked user contributions, and may present (at 522) the contents of the particular asset with UI elements for selecting audio snippet 516 and visual input 518. Selection of the audio snippet UI element may transition the particular asset to the first set of frames, may start playback of the particular asset from the first set of frames, and/or may start playback of audio snippet 516. Additionally, the UI may provide a textual transcription of the audio from audio snippet 516. Selection of the visual input UI element may transition the particular to the second set of frames, may start playback of the particular asset from the second set of frames, and/or may recreate visual input 518 in conjunction with playback of the second set of frames.

In some embodiments, the UI may include a search interface. The search interface may be used to match search terms, that correspond to spoken words or identifiers for certain interactions or contributions, against the transcript of audio snippet 516 and/or textual identifiers for identifying visual input 518. In response to matching a search term to the transcript of audio snippet 516, the UI may select audio snippet 516 and/or may playback the part of the conference at which audio snippet 516 and/or the search terms are detected.

Some assets may be presented within multiple different conferences, and may be linked with participant contributions from each of the different conferences. Such assets may have an extensive list of user contributions from the different conferences. Collaboration system 100 may organize the user contributions from the different conferences under different conference UI elements. In other words, a single conference UI element may contain all the linked participant contributions from one conference, and each conference UI element may be selected and expanded to reveal UI elements for each of the contained contributions that were extracted from the selected conference.

For privacy or security reasons, collaboration system 100 may restrict which participants may receive or access the contributions that were linked from different conferences. For instance, collaboration system 100 may allow only the participants of a particular conference to receive or access the participant contributions to assets that were presented during that particular conference.

Figure 6:
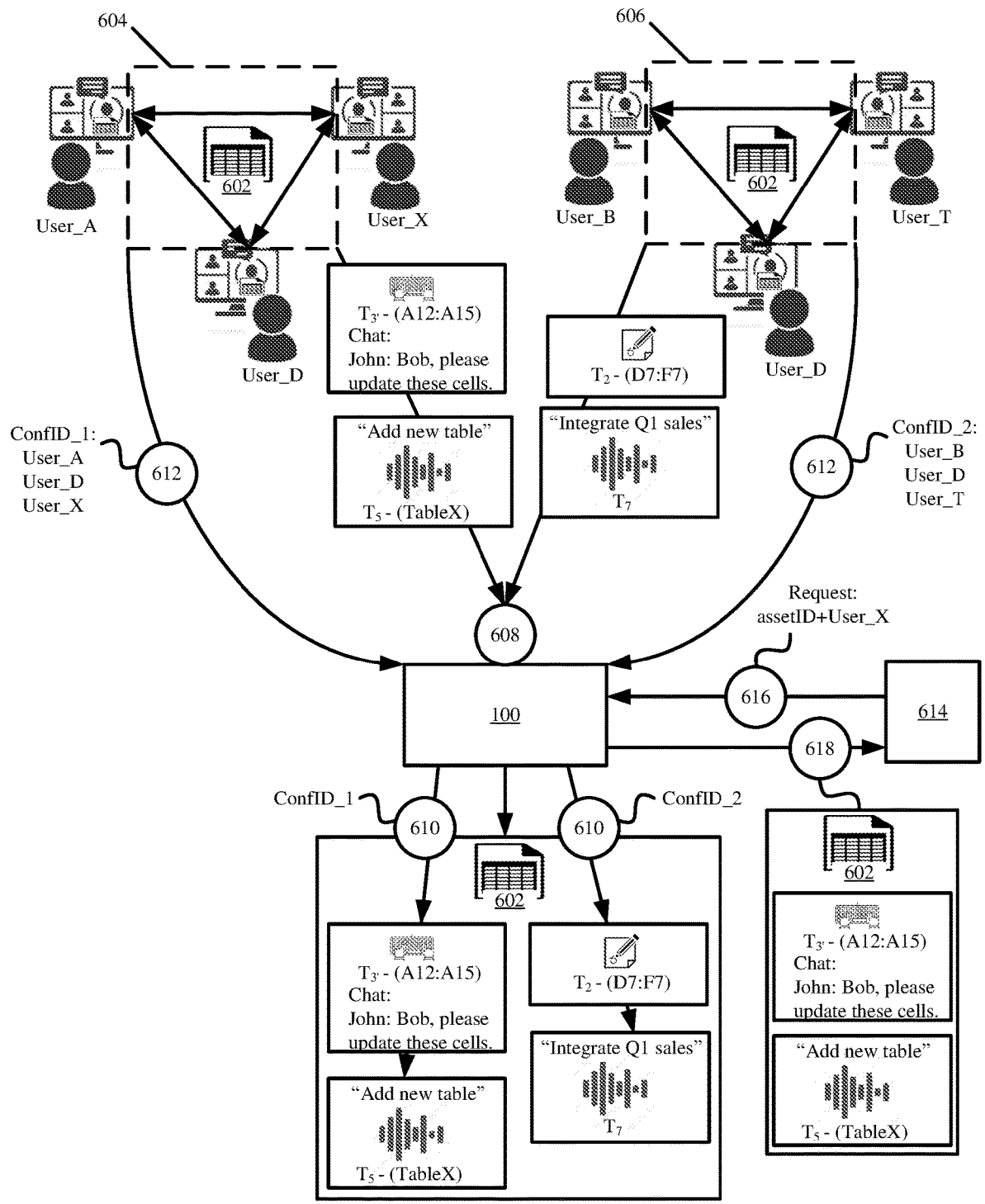
FIG. 6 illustrates an example of restricting access to participant contributions from specific conferences in accordance with some embodiments presented herein.

FIG. 6 illustrates an example of restricting access to participant contributions from specific conferences in accordance with some embodiments presented herein. As shown in FIG. 6, asset 602 may be presented within first conference 604 and later second conference 606. During each conference 604 and 606, various participant contributions may be extracted (at 608) and linked back to asset 602 by collaboration system 100. Collaboration system 100 may tag (at 610) each participant contribution with a conference identifier that identifies which of first conference 604 or second conference 606 the participant contribution was extracted from.

Additionally, collaboration system 100 may track (at 612) a participant identifier for each participant that participated in or was involved with first conference 604 or second conference 606. In some embodiments, tracking (at 612) the participant identifier may include creating a database entry that links the participant identifier for every participant of first conference 604 to the first conference identifier, and that links the participant identifier for every participant of second conference 606 to the second identifier.

User device 614 may issue (at 616) a request to access asset 602. From the request, collaboration system 100 may extract the asset identifier for asset 602 and a participant identifier. The participant identifier may include a unique identifier of user device 614 or the user associated with user device 614. The participant identifier may be a network address, device signature, and/or other unique user signature that is also used to identify the user or user device 614 when participating in a conference. In some embodiments, the unique user signature may be determined from login credentials provided by the user device.

Collaboration system 100 may retrieve asset 602 from an asset repository or local storage, and/or may query a database for the participant contributions that are linked to asset 602 using the asset identifier. In some embodiments, collaboration system 100 may provide the participant identifier along with the asset identifier when querying the database to filter the returned participant contributions to include participant contributions from conferences in which the participant identifier is listed as a participant and to exclude participant contributions from conferences in which the participant identifier is not listed as a participant. In some other embodiments, collaboration system 100 may receive all participant contributions that are linked to asset 602 from the database, and collaboration system 100 may filter the participant contributions to retain the participant contributions that were generated from one or more conferences in which the participant identifier was listed as one of the participants.

In some embodiments, the filtering may include performing a lookup of the participant identifier against the tracked (at 612) list of participant identifiers that participated in or were involved with first conference 604 or second conference 606. In this example, collaboration system 100 may determine that the user associated with user device 614 or user device 614 was a participant in first conference 604. Accordingly, collaboration system 100 may retain the participant contributions that are linked to requested asset 602 and that are tagged with the first conference identifier for first conference 604, and may exclude other participant contributions that are tagged with the second conference identifier or a conference identifier other than the first conference identifier.

In response to the request from user device 614, collaboration system 100 may provide (at 618) requested asset 602 and the filtered list of user contributions that are tagged with the first conference identifier of first conference 604. Collaboration system 100 may thereby expose comments, markups, and/or other user input from conferences that the user participated in or was a part of, and may hide comments, markups, and/or other user input from conferences that the user did not participated in or was not a part of.

Collaboration system 100 may include one or more devices with software and/or hardware resources for performing the conference monitoring, participant contribution extraction, and participant contribution linking to different assets, and/or for providing the individual assets and linked participant contributions in response to requests for those assets. The user devices may correspond to one or more network-enabled devices for requesting, accessing, and/or interfacing with collaboration system 100. More generally, the user devices with which different users may connect to collaboration system 100, may participate in different conferences, may view the individual assets with the linked participant contributions, and/or may access each linked contribution of a particular asset while accessing that particular asset. The user devices may include a personal digital assistant ("PDA"), a "smart" phone, a cellular phone, a laptop computer, a tablet computer, a desktop computer, a consumer or business appliance, a "smart" television, a set-top box, a gaming device, or another device that has the ability to connect to a wired or wireless network.

Figure 7:
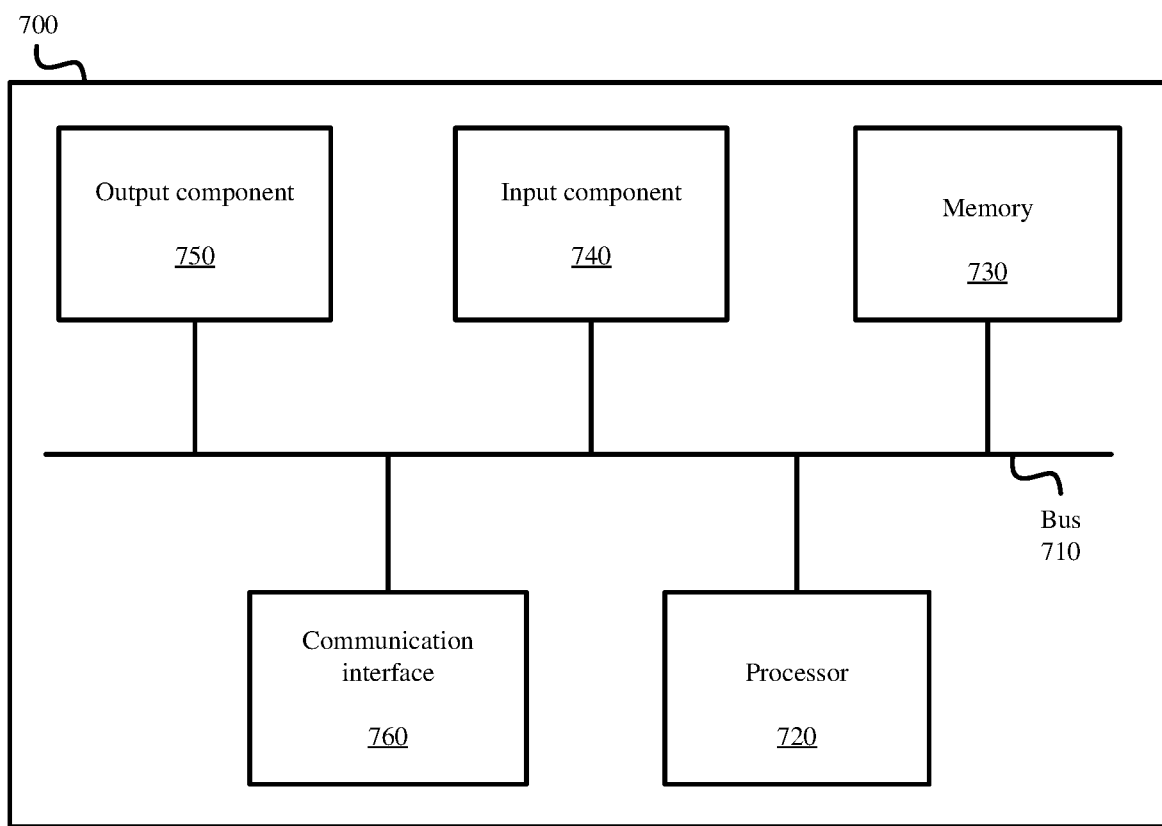
FIG. 7 illustrates example components of one or more devices, according to one or more embodiments described herein.

FIG. 7 is a diagram of example components of device 700. Device 700 may be used to implement one or more of the devices or systems described above (e.g., collaboration system 100, user devices 302, 502, and 614, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A method comprising:
monitoring a conference involving two or more participants and at least a first asset that is presented during a particular interval of the conference by one of the two or more participants;
extracting a first participant contribution that is made prior to presenting the first asset in the conference, and a second participant contribution that is made during the particular interval of the conference the first asset is presented;

linking the second participant contribution, that is extracted from the conference, directly to the first asset and separate from a recorded copy of the conference;

receiving a request for the first asset after the conference has concluded; and providing the first asset with the second participant contribution in response to the request, wherein providing the first asset with the second participation comprises retrieving the first asset with the second participant contribution without accessing the recorded copy of the conference in response to the request for the first asset.

2. The method of claim 1 further comprising:

determining a particular state of the first asset when the second participant contribution is made, wherein the first asset has a plurality of different states during the particular interval of the conference; and wherein linking the second participant contribution comprises linking the second participant contribution to the particular state of the first asset.

3. The method of claim 2, wherein providing the first asset with the second participant contribution further comprises:

presenting the first asset in a user interface ("UI") with a UI element for accessing the second participant contribution; and transitioning the first asset to the particular state in response to a selection of the UI element while presenting the first asset in the UI.

4. The method of claim 3, wherein transitioning the first asset comprises one or more of:

(i) playing a particular set of frames from a video, (ii) selecting one or more elements from a plurality of elements of the first asset, or (iii) presenting a particular slide from a plurality of slides of the first asset simultaneously with a presentation of the second participant contribution, wherein the particular set of frames, the one or more elements, or the particular slide corresponds to the particular state of the first asset.

5. The method of claim 2, wherein providing the first asset with the second participant contribution further comprises:

opening a first file associated with the first asset without opening a second file storing the recorded copy of the conference;

presenting the first asset at a first state of the plurality of different states with a UI element for the second participant contribution;

receiving a selection of the UI element; and presenting the second participant contribution with the particular state of the first asset.

6. The method of claim 1, wherein the second participant contribution comprises one or more of:

an audio snippet of at least one of the two or more participants speaking during the particular interval of the conference the first asset is presented, text messages exchanged between the two or more participants during the particular interval, or visual markups generated by at least one of the two or more participants during the particular interval.

7. The method of claim 1, wherein linking the second participant contribution to the first asset comprises:

adding the second participant contribution as metadata of a file storing the first asset.

8. The method of claim 1, wherein linking the second participant contribution to the first asset comprises:

storing, in a database, an identifier of the first asset, the second participant contribution, and a particular state that the first asset had when the second participant contribution was introduced into the conference.

9. The method of claim 8, wherein providing the first asset with the second participant contribution comprises:

extracting the identifier of the first asset from the request;

querying the database based on the identifier from the request; and obtaining, based on the querying, the second participant contribution and the particular state of the first asset to provide with the first asset in response to the request.

10. The method of claim 1 further comprising:

extracting a third participant contribution that is made during the particular interval when the first asset has a first state, wherein the second participant contribution is made during the particular interval when the first asset has a different second state; and generating a UI that presents the first asset and selectable UI elements for the second participant contribution and the third participant contribution.

11. The method of claim 10 further comprising:

modifying the UI to present the first asset with the first state and the third participant contribution in response to selection of the selectable UI element for the third participant contribution; and modifying the UI to present the first asset with the second state and the second participant contribution in response to selection of the selectable UI element for the second participant contribution.

12. The method of claim 1, wherein providing the first asset with the second participant contribution further comprises:

obtaining audio of at least one of the two or more participants speaking during the particular interval;

generating text based on a transcription of the audio; and presenting the text with contents of the first asset.

13. The method of claim 1, wherein the conference is a first conference, the method further comprising:

monitoring a second conference involving two or more different participants than the first conference and at least the first asset that is presented during the second conference;

extracting a third participant contribution that is made when the first asset is presented as part of the second conference;

linking the third participant contribution to the first asset in addition to the second participant contribution from the first conference being linked to the first asset; and wherein receiving the request for the first asset comprises:

determining an identifier of a user or user device issuing the request;

determining that the identifier matches identifiers for one of the two or more participants from the first conference, and that the identifier does not match identifiers for any of the two or more different participants from the second conference; and filtering participant contributions that are linked to the first asset in response to determining that the identifier matches identifiers for one of the two or more participants from the first conference, wherein filtering the participant contributions comprises retaining the second participant contribution and discarding the third participant contribution that is linked to the first asset.

14. The method of claim 1 further comprising:

detecting presentation of a second asset after the first asset in the conference;

extracting a third participant contribution that is made after detecting the presentation of the second asset and during the presentation of the second asset;

linking the third participant contribution to the second asset;

receiving a request for the second asset after the conference has concluded; and providing the second asset with the third participant contribution in response to the request for the second asset.

15. A system comprising:

one or more processors configured to:

monitor a conference involving two or more participants and at least a first asset that is presented during a particular interval of the conference by one of the two or more participants;

extract a first participant contribution that is made prior to presenting the first asset in the conference, and a second participant contribution that is made during the particular interval of the conference the first asset is presented;

link the second participant contribution, that is extracted from the conference, directly to the first asset and separate from a recorded copy of the conference;

receive a request for the first asset after the conference has concluded; and provide the first asset with the second participant contribution in response to the request, wherein providing the first asset with the second participation comprises retrieving the first asset with the second participant contribution without accessing the recorded copy of the conference in response to the request for the first asset.

16. The system of claim 15, wherein the one or more processors are further configured to:

determine a particular state of the first asset when the second participant contribution is made, wherein the first asset has a plurality of different states during the particular interval of the conference; and wherein linking the second participant contribution comprises linking the second participant contribution to the particular state of the first asset.

17. The system of claim 16, wherein providing the first asset with the second participant contribution further comprises:

presenting the first asset in a user interface ("UI") with a UI element for accessing the second participant contribution; and transitioning the first asset to the particular state in response to a selection of the UI element while presenting the first asset in the UI.

18. The system of claim 16, wherein providing the first asset with the second participant contribution further comprises:

opening a first file associated with the first asset without opening a second file storing the recorded copy of the conference;

presenting the first asset at a first state of the plurality of different states with a UI element for the second participant contribution;

receiving a selection of the UI element; and presenting the second participant contribution with the particular state of the first asset.

19. A non-transitory computer-readable medium, storing a plurality of processor-executable instructions to:

monitor a conference involving two or more participants and at least a first asset that is presented during a particular interval of the conference by one of the two or more participants;

extract a first participant contribution prior to presenting the first asset in the conference, and a second participant contribution that is made during the particular interval of the conference the first asset is presented;

link the second participant contribution, that is extracted from the conference, directly to the first asset and separate from a recorded copy of the conference;

receive a request for the first asset after the conference has concluded; and provide the first asset with the second participant contribution in response to the request, wherein providing the first asset with the second participation comprises retrieving the first asset with the second participant contribution without accessing the recorded copy of the conference in response to the request for the first asset.

* * * * *